(12) United States Patent
Hsia

(10) Patent No.: US 10,660,184 B2
(45) Date of Patent: May 19, 2020

(54) SOLID-STATE LIGHTING WITH MULTIPLE TIME DELAYS

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 16/664,034

(22) Filed: Oct. 25, 2019

(65) Prior Publication Data

US 2020/0060010 A1 Feb. 20, 2020

Related U.S. Application Data

(63) Continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of
(Continued)

(51) Int. Cl.
| | |
|---|---|
| *H05B 47/16* | (2020.01) |
| *H02M 1/44* | (2007.01) |
| *H02J 9/06* | (2006.01) |
| *H02J 7/02* | (2016.01) |
| *H02J 7/04* | (2006.01) |
| *H05B 45/37* | (2020.01) |

(Continued)

(52) U.S. Cl.
CPC ............. *H05B 47/16* (2020.01); *H02J 7/022* (2013.01); *H02J 7/027* (2013.01); *H02J 7/04* (2013.01); *H02J 9/061* (2013.01); *H02M 1/44* (2013.01); *H05B 45/37* (2020.01); *H05B 45/44* (2020.01); *H05B 45/50* (2020.01)

(58) Field of Classification Search
None
See application file for complete search history.

(56) References Cited

U.S. PATENT DOCUMENTS 5,666,029 A * 9/1997 McDonald ............... H01J 9/42
                                                    315/86
7,592,780 B2 * 9/2009 Funabashi ............. H02J 7/022
                                                    320/150

(Continued)

*Primary Examiner* — Minh D A
*Assistant Examiner* — James H Cho
(74) *Attorney, Agent, or Firm* — Han IP PLLC; Andy M. Han

(57) ABSTRACT

A light-emitting diode (LED) luminaire comprising a normally operated portion and an emergency operated portion is used to replace a luminaire operated only in a normal mode with alternate-current (AC) mains. The normally operated portion comprises LED arrays and a power supply whereas the emergency operated portion comprises a rechargeable battery, a charging circuit, an LED driving circuit, a self-diagnostic circuit, and a charging detection and control circuit. According to availability of the AC mains, the LED luminaire can auto-select to work in an emergency mode when a line voltage from the AC mains is unavailable. The self-diagnostic circuit comprises multiple timers and is configured to provide multiple sequences and to auto-test battery discharging current according to the multiple sequences. During an auto-test period, a terminal voltage on the rechargeable battery and an LED forward voltage across the LED arrays are examined with test results displayed in a status indicator.

21 Claims, 4 Drawing Sheets

Related U.S. Application Data application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818.

(51) Int. Cl.
*H05B 45/44* (2020.01)
*H05B 45/50* (2020.01)

(56) References Cited

U.S. PATENT DOCUMENTS

| | | | |
|---|---|---|---|
| 9,667,096 B2* | 5/2017 | Han | F21S 9/022 |
| 2015/0214785 A1* | 7/2015 | Jagjitpati | H02J 9/065 |
| | | | 307/66 |
| 2019/0058343 A1* | 2/2019 | Liu | H02J 7/00 |

* cited by examiner

SOLID-STATE LIGHTING WITH MULTIPLE TIME DELAYS

CROSS-REFERENCE TO RELATED APPLICATIONS

The present disclosure is part of a continuation-in-part (CIP) application of U.S. patent application Ser. No. 16/572,040, filed 16 Sep. 2019, which is part of CIP application of U.S. patent application Ser. No. 16/547,502, filed 21 Aug. 2019, which is part of CIP application of U.S. patent application Ser. No. 16/530,747, filed 2 Aug. 2019, which is part of CIP application of U.S. patent application Ser. No. 16/458,823, filed 1 Jul. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaires and more particularly to an LED luminaire that includes a self-diagnostic circuit with multiple time delays in a dual mode luminaire to operate thereof and to auto-test charging and discharging current of a rechargeable battery, ensuring the dual mode luminaire to work at all times.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested to ensure they are in proper working conditions at all times. It is, therefore, the manufacturers' responsibility to design an LED lamp, an LED luminaire, or an LED lighting system with a self-diagnostic mechanism such that after the LED lamp or the LED luminaire is installed on a ceiling or a high place in a room, the self-diagnostic mechanism can work with an emergency battery backup system to periodically auto-test charging and discharging current to meet regulatory requirements.

SUMMARY

An LED luminaire comprising a normally operated portion and an emergency operated portion is used to replace a luminaire operated only in a normal mode with alternate-current (AC) mains. The normally operated portion comprises one or more LED arrays with a forward voltage across thereof and a power supply unit that powers the one or more LED arrays when a line voltage from the AC mains is available. The emergency operated portion comprises a rechargeable battery, a control and test circuit, and an LED driving circuit configured to receive power from the rechargeable battery and to generate a voltage operating the one or more LED arrays when the line voltage from the AC mains is unavailable. The control and test circuit comprises a self-diagnostic circuit and a charging detection and control circuit. The control and test circuit is configured to either enable or disable the LED driving circuit and the power supply unit according to availability of the AC mains and whether a rechargeable battery test is initiated. The charging detection and control circuit comprises a first transistor circuit configured to detect a charging voltage.

The power supply unit comprises at least two electrical conductors configured to receive an input voltage, a main full-wave rectifier, and an input filter. The at least two electrical conductors are configured to couple to the emergency operated portion. The main full-wave rectifier is coupled to the at least two electrical conductors and configured to convert the input voltage into a primary direct-current (DC) voltage. The input filter is configured to suppress electromagnetic interference (EMI) noises. The power supply unit further comprises a power switching converter comprising a main transformer and a power factor correction (PFC) and power switching circuit. The PFC and power switching circuit is coupled to the main full-wave rectifier via the input filter and configured to improve a power factor and to convert the primary DC voltage into a main DC voltage. The main DC voltage is configured to directly or indirectly couple to the one or more LED arrays to operate thereof.

The emergency operated portion further comprises at least one full-wave rectifier and a charging circuit. The at least one full-wave rectifier is coupled to the AC mains and configured to convert the line voltage from the AC mains into a first DC voltage. The charging circuit comprises a control device, a first transformer, a first ground reference, and a second ground reference electrically isolated from the first ground reference. The charging circuit is coupled to the at least one full-wave rectifier and configured to convert the first DC voltage into a second DC voltage that charges the rechargeable battery to reach a third DC voltage. The charging circuit is configured to monitor the second DC voltage and to regulate the control device in response to various charging requirements. The LED driving circuit comprises a second transformer having a primary winding and a secondary winding. The LED driving circuit is configured to receive the third DC voltage from the rechargeable battery and to convert the third DC voltage into a fourth DC voltage when the line voltage from the AC mains is unavailable.

The self-diagnostic circuit comprises one or more timers and a test portion. Each of the one or more timers respectively comprises multiple time delays, wherein the multiple time delays comprise at least one initial time delay and a next time delay immediately followed the at least one initial time delay. Upon an initiation of each of the one or more timers, the at least one initial time delay begins with an input voltage applied. At an end of the at least one initial time delay an output of the self-diagnostic circuit is activated to reach a logic high level and remains activated so as to enable the LED driving circuit and the test portion for the next time delay. At an end of the next time delay the output of the self-diagnostic circuit is inactivated activated to drop to a logic low level. At least one initial time delay and the next time delay form a primary sequence that repeats. A duration over the next time delay is configured to allow the self-diagnostic circuit to perform the rechargeable battery test. The respective at least one initial time delay comprises a duration of 30 days. The respective next time delay comprises a duration of 90 minutes. The respective next time delay may further comprise a duration of 30 seconds.

The multiple time delays further comprise a preliminary sequence prior to the at least one initial time delay. The preliminary sequence comprises a first time delay and a second time delay. Upon an initiation of each of the one or more timers, the first time delay begins with an input voltage applied. At an end of the first time delay an output of the self-diagnostic circuit is activated to a reach a logic high level and remains activated so as to enable the LED driving circuit for the second time delay. At an end of the second time delay the output of the self-diagnostic circuit is inactivated to drop to a logic low level. A duration over the first time delay is configured to allow the rechargeable battery to be fully charged whereas a duration over the second time delay is configured to allow the self-diagnostic circuit to perform the rechargeable battery test. The preliminary sequence is configured to prepare an initiation process. The preliminary sequence may be further configured to manage a reset process when the primary sequence fails to complete accidentally or due to a power outage. The second time delay comprises a duration of approximately 90 minutes. The second time delay may further comprise a duration of approximately 30 seconds.

The multiple time delays further comprise a preliminary time delay prior to the at least one initial time delay. Upon an initiation of each of the one or more timers, the preliminary time delay begins with an input voltage applied. At an end of the preliminary time delay, the primary sequence continues and repeats. A duration over the preliminary time delay is configured to allow the rechargeable battery to be fully charged.

The charging detection and control circuit further comprises a first peripheral circuit. The first peripheral circuit is configured to sample a fraction of the terminal voltage on the rechargeable battery and to deliver to the test portion to examine over a duration of the next time delay when the rechargeable battery test is initiated. The test portion examines the terminal voltage on the rechargeable battery in reference to a nominal voltage in a range from 85% to 87.5% of either a rated terminal voltage of the rechargeable battery or the third DC voltage before testing. The charging detection and control circuit further comprises a second peripheral circuit configured to sample a fraction of the LED forward voltage and to deliver to the test portion to examine over the duration of the second time delay when the rechargeable battery test is initiated. The charging detection and control circuit further comprises at least one status indicator configured to show self-diagnostic test results.

The self-diagnostic circuit further comprises a control portion configured to receive a signal from the first transistor circuit and to send a first control signal to the control device to inactivate the charging circuit when the rechargeable battery test is initiated. The control portion configured to receive a signal from the first transistor circuit and to send a first control signal to the control device to inactivate the charging circuit when the rechargeable battery test is initiated. The charging detection and control circuit is coupled between the charging circuit and the rechargeable battery and controlled by the self-diagnostic circuit. When the first transistor circuit detects the charging voltage, a pull-down signal is sent to the self-diagnostic circuit to enable a normal charging process. The charging detection and control circuit further comprises a charging control circuit configured to either allow or prohibit a charging current to flow into the rechargeable battery according to availability of the AC mains, and wherein the charging control circuit prohibits the charging current to flow into the rechargeable battery when the rechargeable battery test is initiated. The charging control circuit comprises a second transistor circuit and at least one metal-oxide-semiconductor field-effect transistor (MOSFET) circuit. The second transistor circuit is configured to receive a high-level signal approximately equal to an operating voltage of the self-diagnostic circuit therefrom to pull down a bias voltage of the at least one MOSFET circuit, thereby disconnecting the charging current when the rechargeable battery test is initiated.

The charging detection and control circuit further comprises at least one pair of electrical contacts configured to electrically couple the rechargeable battery to the charging circuit, the LED driving circuit, and the self-diagnostic circuit to operate thereof when the rechargeable battery test is initiated or when the line voltage from the AC mains is not available. When disconnected, the at least one pair of electrical contacts can prevent the rechargeable battery from being drained. The at least one pair of electrical contacts comprise electrical contacts in a switch, a relay, and a jumper, or electrical terminals accommodated for jumper wires. The charging detection and control circuit further comprises a test switch coupled to the self-diagnostic circuit and is configured to manually perform the rechargeable battery test. The charging detection and control circuit further comprises a voltage regulator configured to regulate the terminal voltage to an operating voltage of the self-diagnostic circuit to operate thereof.

The power switching converter further comprises a pulse width modulation (PWM) control circuit and a pair of input ports configured to receive a dimming signal or a PWM signal. When the rechargeable battery test is initiated, the control portion in the self-diagnostic circuit also send a second control signal to the pair of input ports to inactivate the power supply unit when the rechargeable battery test is initiated.

The self-diagnostic circuit may comprise a microcontroller, a microchip, or a programmable logic controller. In this disclosure, the emergency operated portion is integrated into the LED luminaire with the self-diagnostic circuit to auto-test charging and discharging current of a rechargeable battery, supporting dual mode operations of the LED luminaire to work not only in a normal mode but also in an emergency mode.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a "main", a "primary", a "secondary", a "preliminary", an "initial", a "first", a "second", a "third", and so forth does not necessarily represent a part that is mentioned in an ordinal manner, but a particular one.

DETAILED DESCRIPTION OF THE INVENTION

Figure 1:
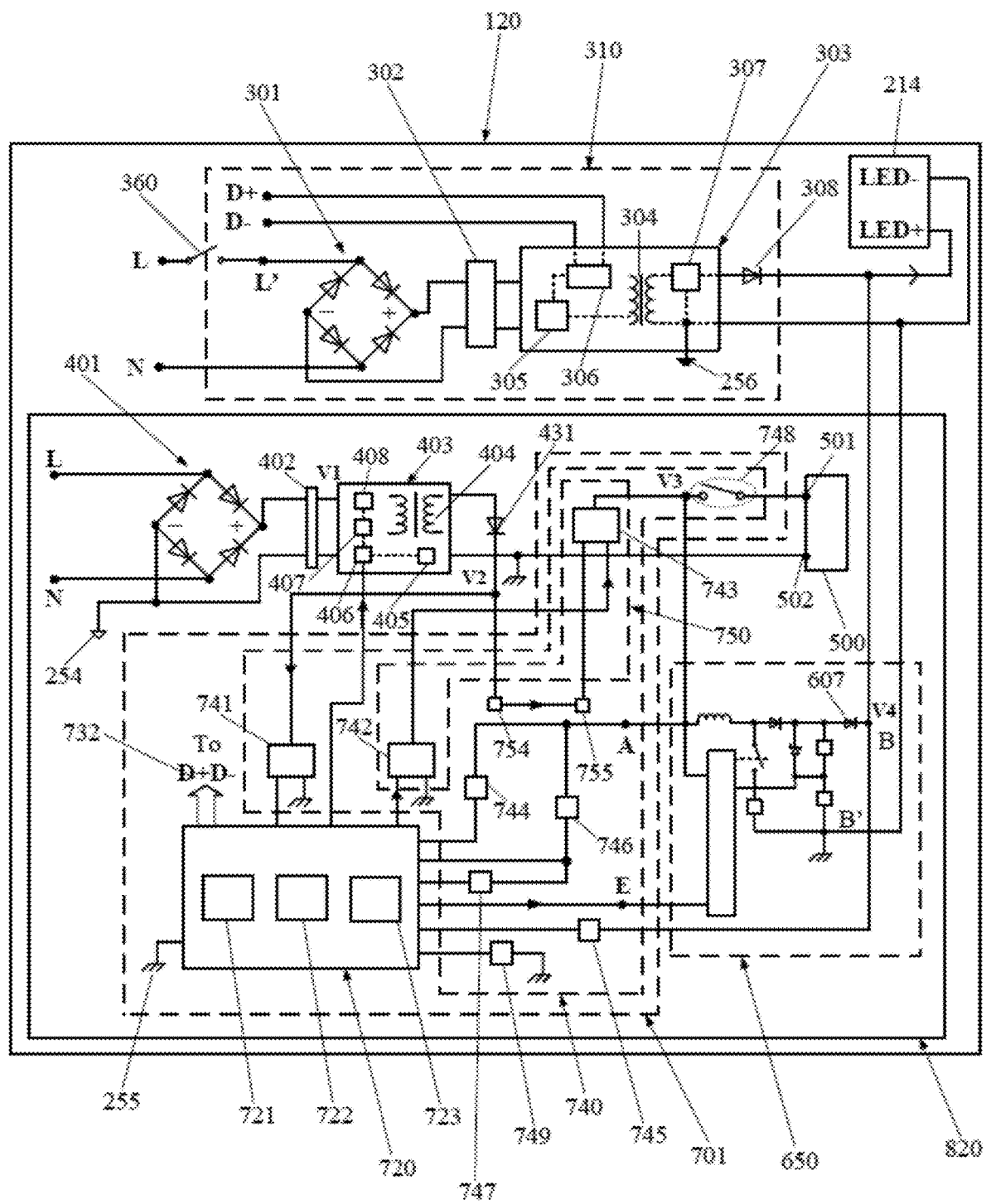
FIG. 1 is a block diagram of an LED luminaire according to the present disclosure.

FIG. 1 is a block diagram of an LED luminaire according to the present disclosure. An LED luminaire 120 is used to replace a fluorescent or an LED lamp normally operated with the AC mains in a normal mode. In FIG. 1, the LED luminaire 120 comprises one or more LED arrays 214 with a forward voltage across thereon, a power supply unit 310, and an emergency operated portion 820. The emergency operated portion 820 comprises an LED driving circuit 650 configured to provide an emergency power (a voltage and a current) to drive the one or more LED arrays 214 when the line voltage from the AC mains is unavailable. The power supply unit 310 originally designed to receive the line voltage from the AC mains for general lighting applications is configured to operate in the normal mode. The power supply unit 310 comprises at least two electrical conductors "L" and "N", a main full-wave rectifier 301, and an input filter 302. The at least two electrical conductors "U" and "N" are configured to couple to "L" and "N" in the emergency operated portion 820 via a power switch 360. The main full-wave rectifier 301 is configured to convert the line voltage from the AC mains into a primary DC voltage. In other words, the at least two electrical conductors "U" and "N" are coupled to a switched power, in which the power supply unit 310 can be turned off. The input filter 302 is configured to suppress EMI noises. The power supply unit 310 further comprises a power switching converter 303 comprising a main transformer 304 and a power factor correction (PFC) and power switching circuit 305. The PFC and power switching circuit 305 is coupled to the main full-wave rectifier 301 via the input filter 302 and configured to improve a power factor and to convert the primary DC voltage into a main DC voltage. The main DC voltage is configured to couple to the one or more LED arrays 214 to operate thereon. The main transformer 304 comprises a third ground reference 256, electrically isolated from a negative (−) port of the main full-wave rectifier 301. The one or more LED arrays 214 comprises a first terminal LED+ and a second terminal LED-configured to receive an LED driving current from the first terminal LED+ and to return from the second terminal LED—to either the LED driving circuit 650 or the power supply unit 310, depending on which one is an LED driving current source. The power switching converter 303 further comprises a PWM control circuit 306 and a pair of input ports denoted as "D+D−" configured to receive a 0-to-10 V signal, a 1-to-10 V signal, a dimming signal, a PWM signal, or a signal from a variable resistor for luminaire dimming applications. The pair of the input ports "D+D−" may be used to disable the power switching converter 303 when a rechargeable battery test is initiated. The power switching converter 303 is a current source, providing a second LED driving current to the one or more LED arrays 214 to operate thereon.

In FIG. 1, the emergency operated portion 820 further comprises the at least two electrical conductors "L" and "N" configured to couple to the AC mains, a rechargeable battery 500, at least one full-wave rectifier 401, at least one input filter 402 coupled to the at least one full-wave rectifier 401, a charging circuit 403, and a control and test circuit 701. The at least one full-wave rectifier 401 is coupled to the at least two electrical conductors "L" and "N" and configured to convert the line voltage from the AC mains into a first DC voltage. The at least one input filter 402 is configured to suppress EMI noises. The rechargeable battery 500 comprises a high-potential electrode 501 and a low-potential electrode 502 with a terminal voltage across thereon. The charging circuit 403 is an isolated step-down converter and comprises a first ground reference 254, a second ground reference 255 electrically isolated from the first ground reference 254, a first transformer 404, a feedback control circuit 405, a control device 406, a first electronic switch 407, and a diode 408. The charging circuit 403 is coupled to the at least one full-wave rectifier 401 via the input filter 402 and configured to convert the first DC voltage into a second DC voltage that charges the terminal voltage of the rechargeable battery 500 to reach a third DC voltage. The feedback control circuit 405 is configured to monitor the second DC voltage and to regulate the control device 406 according to charging voltage and current requirements. The first transformer 404 comprises a primary winding coupled to the first ground reference 254 and a secondary winding coupled to the second ground reference 255. The first transformer 404 is configured to provide electrical isolation between the AC mains and the second DC voltage with respect to the second ground reference 255. In FIG. 1, the second ground reference 255 is electrically coupled to the low-potential electrode 502 to ease a charging current to flow into the rechargeable battery 500 and to return to the charging circuit 403, completing a power transfer. In FIG. 1, the control and test circuit 701 further comprises a self-diagnostic circuit 720 and a charging detection and control circuit 740. The control and test circuit 701 is configured to either enable or disable the LED driving circuit 650 via a port denoted as "E" according to availability of the AC mains and whether a rechargeable battery test is initiated. The charging detection and control circuit 740 comprises a first transistor circuit 741 configured to detect a charging voltage (i.e. the second DC voltage) generated from the charging circuit 403.

Figure 2:
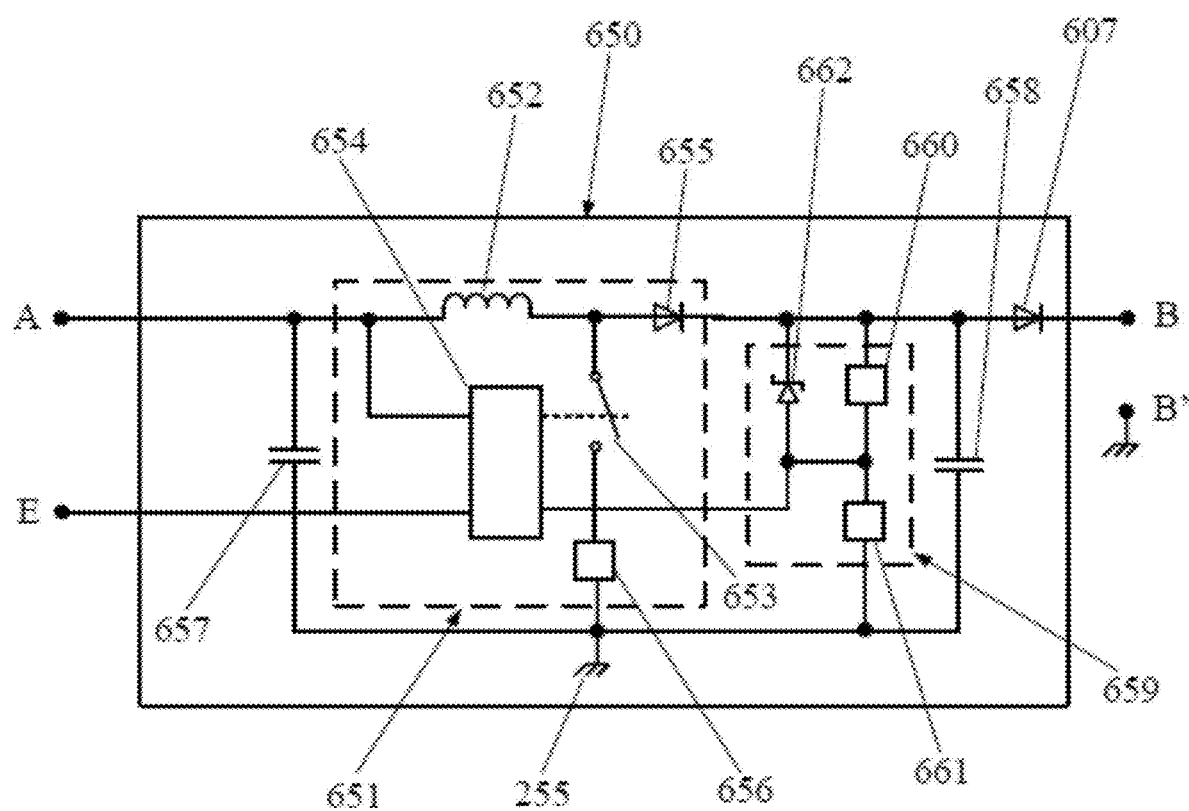
FIG. 2 is a block diagram of an LED driving circuit according to the present disclosure.

FIG. 2 is a block diagram of the LED driving circuit according to the present disclosure. Referring to FIG. 1 and FIG. 2, the LED driving circuit 650 comprises a step-up converter 651 comprising an input inductor 652, an electronic switch 653, a logic control device 654, at least one diode rectifier 655, and a sensing resistor 656. The LED driving circuit 650 further comprises an input capacitor 657, an output capacitor 658 coupled between the at least one diode rectifier 655 and the second ground reference 255, and a Zener diode 662, in which the input capacitor 657 and the output capacitor 658 are configured to filter out unwanted voltage noises generated from the step-up converter 651. The LED driving circuit 650 is configured to boost the third DC voltage into a fourth DC voltage with a first LED driving current at a port "B" with respect to the second ground reference 255. The logic control device 654 is configured to control the electronic switch 653 "on" and "off". The electronic switch 653 comprises either a MOSFET or a bipolar junction transistor (BJT). The LED driving circuit 650 is configured to couple to the third DC voltage via a port denoted as "A" from the rechargeable battery 500. The LED driving circuit 650 further comprises the port "E" to receive an "enable" signal from the self-diagnostic circuit 720 (FIG. 1) to activate the LED driving circuit 650 when the line voltage from the AC mains is unavailable or when the rechargeable battery test is initiated. The fourth DC voltage is greater than an intrinsic forward voltage of the one or more LED arrays 214 to ensure operating the one or more LED arrays 214 without failure when the line voltage from the AC mains is unavailable. In FIG. 1 and FIG. 2, the output capacitor is connected between the at least one diode rectifier 655 and the second ground reference 255, which is further connected to the low-potential electrode 502 (FIG. 1) to ease a discharging current from the rechargeable battery 500 to flow into the LED driving circuit 650 and to return to the rechargeable battery 500, completing a power transfer. In other words, the LED driving circuit 650 is configured to receive the third DC voltage from the rechargeable battery 500 and to convert the third DC voltage into the fourth DC voltage with the first LED driving current to power up the one or more LED arrays 214 when the line voltage from the AC mains is unavailable. On the other hand, the power supply unit 310 is configured to generate the main DC voltage with the second LED driving current to power up the one or more LED arrays 214 at full power and to meet LED luminaire efficacy requirements when the line voltage from the AC mains is available.

Figure 3:
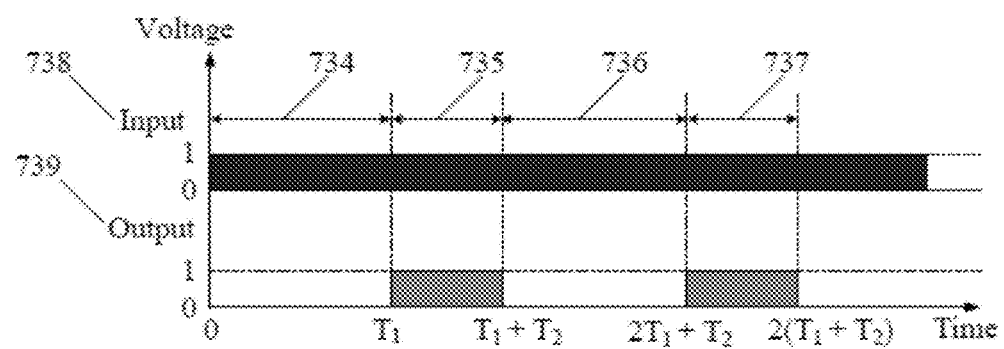
FIG. 3 is a first timing diagram of a self-diagnostic circuit according to the present disclosure.

FIG. 3 is a first timing diagram of the self-diagnostic circuit 720 according to the present disclosure. The self-diagnostic circuit 720 comprises one or more timers 721 and a test portion 722 (FIG. 1) which, in one embodiment, may be implemented in hardware as an electronic circuit. Each of the one or more timers 721 respectively comprises multiple time delays. Each of the one or more timers 721 comprises at least one initial time delay 734 with a duration of $T_1$ and a next time delay 735 with a duration of $T_2$ immediately followed the at least one initial time delay 734. Upon an initiation of each of the one or more timers 721, the at least one initial time delay 734 begins with an input voltage 738 applied. At the end of the at least one initial time delay 734, an output 739 of the self-diagnostic circuit 720 is activated to reach a logic high level (i.e. "1" state) and remains activated so as to enable the LED driving circuit 650 and the test portion 722 for the next time delay 735. At the end of the next time delay 735, the output 739 of the self-diagnostic circuit 720 is inactivated to drop to a logic low level (i.e. "0" state). The at least one initial time delay 734 and the next time delay 735 form a primary sequence with a duration of $T_1+T_2$. The primary sequence with the duration of $T_1+T_2$ repeats (736 and 737, for example) until the third DC voltage (FIG. 1) is removed from the self-diagnostic circuit 720. In FIG. 3, the input 738 shown comprises two states "0" and "1", in which "0" means no voltage appeared at the input 738 of the self-diagnostic circuit 720 whereas "1" means the third DC voltage is applied. Similarly, the output 739 shown comprises two states "0" and "1", in which "0" means no voltage appeared or being inactivated at the output 739 of the self-diagnostic circuit 720 whereas "1" means that the output 739 of the self-diagnostic circuit 720 provides an output high-level voltage or is activated. The duration $T_2$ over the next time delay 735 is configured to allow the self-diagnostic circuit 720 to perform the rechargeable battery test. In other words, the self-diagnostic circuit 720 sends the output high-level voltage to enable the LED driving circuit 650 via the port "E" during the next time delay 735. The respective at least one initial time delay 734 comprises a duration of 30 days. The respective next time delay 735 comprises a duration of 90 minutes.

Figure 4:
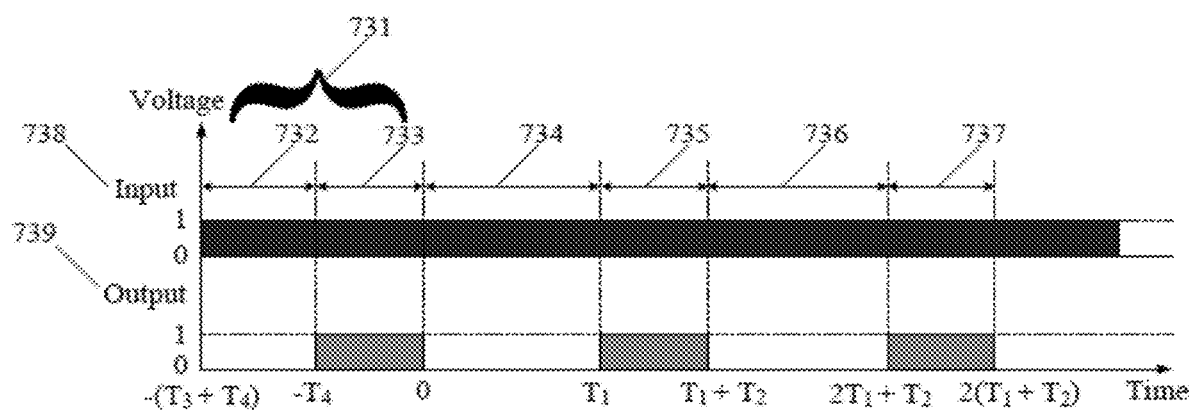
FIG. 4 is a second timing diagram of a self-diagnostic circuit according to the present disclosure.

FIG. 4 is a second timing diagram of a self-diagnostic circuit according to the present disclosure. The multiple time delays further comprise a preliminary sequence 731 prior to the at least one initial time delay 734. The preliminary sequence 731 comprises a first time delay 732 and a second time delay 733. Upon an initiation of each of the one or more timers 721, the first time delay 732 begins with an input voltage 738 applied. At an end of the first time delay 732, the output 739 of the self-diagnostic circuit 720 is activated to reach a logic high level and remains activated so as to enable the LED driving circuit 650 and the test portion 722 for the second time delay 733. At an end of the second time delay 733, the output 739 of the self-diagnostic circuit 720 is inactivated to drop to a logic low level. A duration $T_3$ over the first time delay 732 is configured to allow the rechargeable battery 500 to be fully charged whereas a duration $T_4$ over the second time delay 733 is configured to allow the self-diagnostic circuit 720 to perform the rechargeable battery test. In other words, the self-diagnostic circuit 720 sends the output high-level voltage to enable the LED driving circuit 650 via the port "E" during the second time delay 733. The preliminary sequence 731 is configured to prepare an initiation process. The preliminary sequence 731 may be further configured to manage a reset process when the primary sequence fails to complete accidentally or due to a power outage. The second time delay 733 comprises a duration $T_4$ of approximately 90 minutes. The second time delay may further comprise a duration $T_4$ of approximately 30 seconds.

Figure 5:
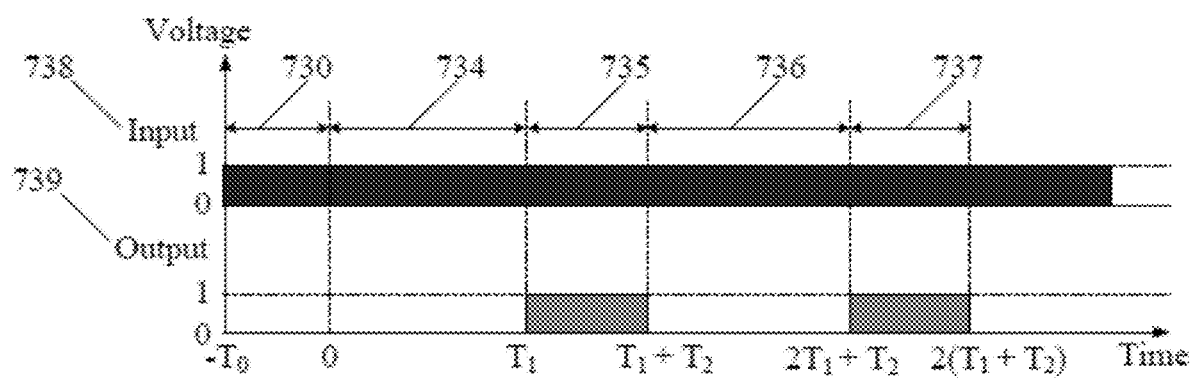
FIG. 5 is a third timing diagram of a self-diagnostic circuit according to the present disclosure.

FIG. 5 is a third timing diagram of a self-diagnostic circuit according to the present disclosure. The multiple time delays further comprise a preliminary time delay 730 prior to the at least one initial time delay 734. Upon an initiation of each of the one or more timers 721, the preliminary time delay 730 begins with an input voltage 738 applied. At an end of the preliminary time delay 730, the primary sequence with the duration of $T_1+T_2$ continues (over a duration of 734 and 735) and repeats (over a duration of 736 and 737) until the third DC voltage (FIG. 1) is removed from the self-diagnostic circuit 720. A duration $T_0$ over the preliminary time delay 730 is configured to allow the rechargeable battery to be fully charged. The duration $T_0$ over the preliminary time delay 730 may comprise a duration of 24 hours or 48 hours.

In FIG. 1, the charging detection and control circuit 740 further comprises a first peripheral circuit 744. The first peripheral circuit 744 is configured to sample a fraction of the terminal voltage on the rechargeable battery 500 and to deliver to the test portion 722 to examine over the duration of the next time delay 735 or the duration of the second time delay 733 when the rechargeable battery test is initiated. The test portion 722 examines the terminal voltage on the rechargeable battery 500 in reference to a nominal voltage in a range from 85% to 87.5% of either a rated terminal voltage of the rechargeable battery 500 or the third DC voltage before testing. The charging detection and control circuit 740 further comprises a second peripheral circuit 745 configured to sample a fraction of the LED forward voltage and to deliver to the test portion 722 to examine over the duration of the next time delay 735 or the duration of the second time delay 733 when the rechargeable battery test is initiated. The charging detection and control circuit 740 further comprises a voltage regulator 746 configured to regulate the terminal voltage to an operating voltage of the self-diagnostic circuit 720 to operate thereof. The charging detection and control circuit 740 further comprises at least one status indicator 747 controlled by the self-diagnostic circuit 720 and configured to show self-diagnostic test results.

The self-diagnostic circuit 720 further comprises a control portion 723, which, in one embodiment, may be implemented in hardware as an electronic circuit. The control portion 723 is configured to receive a pull-up signal from the first transistor circuit 741 and to send a first control signal to the control device 406 to inactivate the charging circuit 403 when the rechargeable battery test is initiated. The charging detection and control circuit 740 is coupled between the charging circuit 403 and the rechargeable battery 500 and controlled by the self-diagnostic circuit 720. When the first transistor circuit 741 detects the charging voltage, a pull-down signal is sent to the self-diagnostic circuit 720 to enable a normal charging process. The charging detection and control circuit 740 further comprises a charging control circuit 750 comprising a second transistor circuit 742 and at least one MOSFET circuit 743. The charging control circuit 750 is configured to either allow or prohibit a charging current to flow into the rechargeable battery 500 according to availability of the AC mains, and wherein the charging control circuit 750 prohibits the charging current to flow into the rechargeable battery 500 when the rechargeable battery test is initiated. The second transistor circuit 742 is configured to receive a high-level signal approximately equal to an operating voltage of the self-diagnostic circuit 720 therefrom to pull down a bias voltage of the at least one MOSFET circuit 743, thereby disconnecting the charging current when the rechargeable battery test is initiated.

The charging detection and control circuit 740 further comprises at least one pair of electrical contacts 748 configured to electrically couple the rechargeable battery 500 to the charging circuit 403, the LED driving circuit 650, and the self-diagnostic circuit 720 when the at least one pair of electrical contacts 748 are connected. When the rechargeable battery test is initiated or when the line voltage from the AC mains is unavailable, power from the rechargeable battery 500 can operate the LED driving circuit 650 and the self-diagnostic circuit 720. On the other hand, when disconnected, the at least one pair of electrical contacts 748 can safely prevent the rechargeable battery 500 from being drained. The at least one pair of electrical contacts 748 comprise electrical contacts in a switch, a relay, and a jumper, or electrical terminals accommodated for jumper wires. The charging detection and control circuit 740 further comprises a test switch 749 coupled to the self-diagnostic circuit 720 and is configured to manually have the self-diagnostic circuit 720 initiate the rechargeable battery test. The test switch 749 may be further configured to manually have the self-diagnostic circuit 720 terminate the rechargeable battery test that is in progress. In FIG. 1, when the rechargeable battery test is initiated, the control portion 723 in the self-diagnostic circuit 720 may send a second control signal to the pair of input ports D+D− to the power supply unit 310 to inactivate thereof.

The charging detection and control circuit 740 further comprises at least one diode 754, and at least one resistor 755 connected in series with the at least one diode 754. The at least one diode 754 and the at least one resistor 755 are electrically coupled between the charging circuit 403 and the rechargeable battery 500 and configured to control a current flowing direction and to set up a voltage drop so that the first transistor circuit 741 can readily detect whether the charging voltage exists and determine whether the line voltage from the AC mains is available or not. The power supply unit 310 further comprises a first current blocking diode 308 coupled to both the power switching converter 303 at one end of the first current blocking diode 308 and the one or more LED arrays 214 at the other end of the first current blocking diode 308. The first current blocking diode 308 is configured to couple to the one or more LED arrays 214 to prevent an LED driving current provided by the LED driving circuit 650 from flowing in, avoiding crosstalk. Similarly, the LED driving circuit 650 may further comprise a second current blocking diode 607 configured to couple to the one or more LED arrays 214 to prevent an LED driving current provided by the power supply unit 310 from flowing in, avoiding crosstalk.

The self-diagnostic circuit 720 may comprise a microcontroller, a microchip, or a programmable logic controller. In this disclosure, the emergency operated portion 820 is integrated into the LED luminaire 120 with the self-diagnostic circuit 720 to auto-test charging and discharging current of a rechargeable battery 500 with test results displayed in a status indicator, supporting dual mode operations of the LED luminaire 120 to work not only in a normal mode but also in an emergency mode.

Whereas preferred embodiments of the present disclosure have been shown and described, it will be realized that alterations, modifications, and improvements may be made thereto without departing from the scope of the following claims. Another kind of schemes with an emergency operated portion and multiple timers and multiple time delays adopted to operate an LED luminaire using various kinds of combinations to accomplish the same or different objectives could be easily adapted for use from the present disclosure. Accordingly, the foregoing descriptions and attached drawings are by way of example only and are not intended to be limiting.

What is claimed is:

1. A light-emitting diode (LED) luminaire, comprising:
   at least two electrical conductors configured to couple to alternate-current (AC) mains;
   one or more LED arrays with a forward voltage across thereon;
   a rechargeable battery with a terminal voltage across thereon;
   at least one full-wave rectifier coupled to the at least two electrical conductors and configured to convert a line voltage from the AC mains into a first direct-current (DC) voltage;
   at least one input filter coupled to the at least one full-wave rectifier, the at least one input filter configured to suppress an electromagnetic interference (EMI) noise;
   a charging circuit comprising a control device, a first transformer, a first ground reference, and a second ground reference electrically isolated from the first ground reference, the charging circuit coupled to the at least one full-wave rectifier via the at least one input filter and configured to convert the first DC voltage into a second DC voltage that charges the terminal voltage of the rechargeable battery to reach a third DC voltage;
   an LED driving circuit comprising an input inductor, an electronic switch, at least one diode rectifier, and an output capacitor connected between the at least one diode rectifier and the second ground reference, the LED driving circuit configured to convert the third DC voltage from the rechargeable battery into a fourth DC voltage to light up the one or more LED arrays when the line voltage from the AC mains is unavailable;
   a power supply unit comprising a main transformer, the power supply unit configured to generate a main DC voltage to power up the one or more LED arrays at full power and to meet LED luminaire efficacy requirements when the line voltage from the AC mains is available; and
   a control and test circuit comprising a self-diagnostic circuit and a charging detection and control circuit, wherein the control and test circuit is configured to enable or disable the LED driving circuit and the power supply unit according to availability of the AC mains and whether a rechargeable battery test is initiated, and wherein the self-diagnostic circuit comprises a test portion operated when the rechargeable battery test is initiated,
   wherein:
      the charging circuit, the LED driving circuit, the power supply unit, and the control and test circuit are configured to auto-select either the main DC voltage or the fourth DC voltage to operate the one or more LED arrays; and the self-diagnostic circuit further comprises one or more timers, wherein each of the one or more timers respectively comprises multiple time delays, wherein the multiple time delays of each of the one or more timers respectively comprise at least one initial time delay and a next time delay immediately following the at least one initial time delay, wherein, upon an initiation of each of the one or more timers, the at least one initial time delay begins with an input voltage applied, wherein, at an end of the at least one initial time delay, an output of the self-diagnostic circuit is activated to reach a logic high level and remains activated so as to enable the LED driving circuit and the test portion for the next time delay, wherein, at an end of the next time delay, the output of the self-diagnostic circuit is inactivated to drop to a logic low level, wherein the at least one initial time delay and the next time delay form a primary sequence that repeats, and wherein a duration over the next time delay is configured to allow the self-diagnostic circuit to perform the rechargeable battery test.

2. The LED luminaire of claim 1, wherein the multiple time delays of each of the one or more timers respectively further comprise a preliminary sequence prior to the respective at least one initial time delay, wherein the preliminary sequence comprises a first time delay and a second time delay, wherein, upon an initiation of each of the one or more timers, the first time delay begins with an input voltage applied, wherein, at an end of the first time delay, the output of the self-diagnostic circuit is activated to reach the logic high level and remains activated so as to enable the LED driving circuit and the test portion for the second time delay, wherein, at an end of the second time delay, the output of the self-diagnostic circuit is inactivated to drop to the logic low level, wherein a duration over the first time delay is configured to allow the rechargeable battery to be fully charged, wherein a duration over the second time delay is configured to allow the self-diagnostic circuit to perform the rechargeable battery test, and wherein the preliminary sequence is configured to prepare an initiation process.

3. The LED luminaire of claim 2, wherein the second time delay comprises a duration of approximately 90 minutes or approximately 30 seconds.

4. The LED luminaire of claim 2, wherein the preliminary sequence is further configured to manage a reset process when the primary sequence fails to complete accidentally or due to a power outage.

5. The LED luminaire of claim 1, wherein the multiple time delays of each of the one or more timers respectively further comprise a preliminary time delay prior to the at least one initial time delay, wherein, upon an initiation of each of the one or more timers, the preliminary time delay begins with an input voltage applied, wherein, at an end of the preliminary time delay, the primary sequence continues and repeats, and wherein a duration over the preliminary time delay is configured to allow the rechargeable battery to be fully charged.

6. The LED luminaire of claim 1, wherein the charging detection and control circuit comprises a first peripheral circuit configured to sample a fraction of the terminal voltage on the rechargeable battery and to deliver to the test portion to examine over a duration of the next time delay when the rechargeable battery test is initiated.

7. The LED luminaire of claim 6, wherein the test portion is configured to examine the terminal voltage on the rechargeable battery in reference to a nominal voltage in a range from 85% to 87.5% of either a rated terminal voltage of the rechargeable battery or the third DC voltage before testing.

8. The LED luminaire of claim 1, wherein the charging detection and control circuit comprises a second peripheral circuit configured to sample a fraction of the LED forward voltage and to deliver to the test portion to examine over the duration of the next time delay when the rechargeable battery test is initiated.

9. The LED luminaire of claim 1, wherein the charging detection and control circuit comprises at least one status indicator coupled to the self-diagnostic circuit and is configured to show a self-diagnostic test result.

10. The LED luminaire of claim 1, wherein the at least one initial time delay comprises a duration of approximately 30 days, and wherein the next time delay comprises a duration of approximately 90 minutes.

11. The LED luminaire of claim 1, wherein the charging detection and control circuit comprises a first transistor circuit configured to detect a charging voltage, wherein the charging detection and control circuit is coupled between the charging circuit and the rechargeable battery and controlled by the self-diagnostic circuit, and wherein, when the first transistor circuit detects a charging voltage, a pull-down signal is sent to the self-diagnostic circuit to enable a normal charging process.

12. The LED luminaire of claim 11, wherein the self-diagnostic circuit further comprises a control portion configured to receive a pull-up signal from the first transistor circuit and to send a first control signal to the control device to inactivate the charging circuit when the rechargeable battery test is initiated.

13. The LED luminaire of claim 1, wherein the charging detection and control circuit comprises a charging control circuit comprising a second transistor circuit and at least one metal-oxide-semiconductor field-effect transistor (MOSFET) circuit, wherein the charging control circuit is configured to either allow or prohibit a charging current to flow into the rechargeable battery according to availability of the AC mains, and wherein the charging control circuit prohibits the charging current to flow into the rechargeable battery when the rechargeable battery test is initiated.

14. The LED luminaire of claim 13, wherein the second transistor circuit is configured to receive a high-level signal approximately equal to an operating voltage of the self-diagnostic circuit therefrom to pull down a bias voltage of the at least one MOSFET circuit, thereby disconnecting the charging current when the rechargeable battery test is initiated.

15. The LED luminaire of claim 1, wherein the charging detection and control circuit comprises at least one pair of electrical contacts configured to electrically couple the rechargeable battery to the charging circuit, the LED driving circuit, and the self-diagnostic circuit, wherein, when the at least one pair of electrical contacts are connected, power from the rechargeable battery operates the LED driving circuit and the self-diagnostic circuit when the rechargeable battery test is initiated or when the line voltage from the AC mains is unavailable, and wherein, when disconnected, the at least one pair of electrical contacts prevents the rechargeable battery from being drained.

16. The LED luminaire of claim 15, wherein the at least one pair of electrical contacts comprise electrical contacts in a switch, a relay, and a jumper, or electrical terminals accommodated for jumper wires.

17. The LED luminaire of claim 1, wherein the charging detection and control circuit comprises a test switch coupled to the self-diagnostic circuit and is configured to manually have the self-diagnostic circuit initiate the rechargeable battery test.

18. The LED luminaire of claim 17, wherein the test switch is further configured to manually have the self-diagnostic circuit terminate the rechargeable battery test that is in progress.

19. The LED luminaire of claim 1, wherein the charging detection and control circuit comprises a voltage regulator configured to regulate the terminal voltage to an operating voltage of the self-diagnostic circuit to operate thereof.

20. The LED luminaire of claim 1, wherein the power supply unit further comprises a pulse width modulation (PWM) control circuit and a pair of input ports configured to receive a dimming signal or a PWM signal from the self-diagnostic circuit, and wherein the power supply unit is disabled by the self-diagnostic circuit when the rechargeable battery test is initiated.

21. The LED luminaire of claim 1, wherein the self-diagnostic circuit comprises a microcontroller, a microchip, or a programmable logic controller.

* * * * *